(12) United States Patent
Kim et al.

(10) Patent No.: US 8,628,853 B2
(45) Date of Patent: Jan. 14, 2014

(54) POLYCARBONATE RESIN COMPOSITION WITH EXCELLENT FLAME RETARDANCY AND LIGHT STABILITY

(75) Inventors: Pil Ho Kim, Uiwang-si (KR); Jong Cheol Lim, Uiwang-si (KR); Eun Young Park, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 17 days.

(21) Appl. No.: 12/633,081

(22) Filed: Dec. 8, 2009

(65) Prior Publication Data
US 2010/0157217 A1    Jun. 24, 2010

(30) Foreign Application Priority Data

Dec. 19, 2008    (KR) ........................ 10-2008-0130220

(51) Int. Cl.
| B32B 17/00 | (2006.01) |
| B32B 18/00 | (2006.01) |
| C08F 290/06 | (2006.01) |
| C09D 5/18 | (2006.01) |
| C08K 3/00 | (2006.01) |
| B32B 19/00 | (2006.01) |
| G02F 1/1333 | (2006.01) |

(52) U.S. Cl.
USPC ............. 428/407; 428/403; 349/122; 524/81; 524/387; 524/413

(58) Field of Classification Search
None
See application file for complete search history.

(56) References Cited

U.S. PATENT DOCUMENTS

| 2,999,846 | A | | 9/1961 | Schnell et al. |
| 3,028,365 | A | | 4/1962 | Schnell et al. |
| 3,271,367 | A | | 9/1966 | Schnell et al. |
| 4,335,032 | A | | 6/1982 | Rosenquist |
| 4,452,968 | A | | 6/1984 | Bolon et al. |
| 4,888,388 | A | * | 12/1989 | Hongo et al. ................... 525/67 |
| 5,266,618 | A | * | 11/1993 | Watanabe et al. ............. 524/405 |
| 5,391,648 | A | * | 2/1995 | Yamamoto et al. ............ 525/479 |
| 5,837,757 | A | | 11/1998 | Nodera et al. |
| 5,902,539 | A | | 5/1999 | Schmidt et al. |
| 6,063,844 | A | | 5/2000 | Barren et al. |
| 6,194,536 | B1 | | 2/2001 | Schmidt et al. |
| 6,197,857 | B1 | * | 3/2001 | Nodera et al. ................. 524/141 |
| 6,664,313 | B2 | | 12/2003 | Hirai et al. |
| 7,939,591 | B2 | | 5/2011 | Tomoda |
| 2002/0055563 | A1 | | 5/2002 | Asano et al. |
| 2002/0146550 | A1 | | 10/2002 | Hirai et al. |
| 2003/0181573 | A1 | * | 9/2003 | Miyatake et al. ............. 524/504 |
| 2004/0220302 | A1 | * | 11/2004 | Saegusa et al. ............... 524/161 |
| 2004/0249072 | A1 | | 12/2004 | Warth et al. |
| 2004/0260035 | A1 | | 12/2004 | Dairanieh et al. |
| 2007/0072960 | A1 | | 3/2007 | Ma et al. |
| 2007/0208128 | A1 | | 9/2007 | Jung et al. |
| 2009/0239975 | A1 | * | 9/2009 | Jung et al. ...................... 523/206 |

FOREIGN PATENT DOCUMENTS

| JP | 09-012853 | | 1/1997 |
| JP | 2003-213114 | A | 7/2003 |
| KR | 10-0575258 | B1 | 4/2006 |
| KR | 10-0782265 | B1 | 11/2007 |
| WO | 98/24844 | A1 | 6/1998 |
| WO | 2008/082202 | A1 | 7/2008 |
| WO | 2009/139535 | A1 | 11/2009 |

OTHER PUBLICATIONS

International Search Report and Written Opinion in commonly owned International Application No. PCT/KR2007/006967, mailed on Jan. 21, 2008.
International Search Report in commonly owned International Application No. PCT/KR2008/007905 dated Aug. 12, 2009.
Taiwanese Office Action in commonly owned Taiwanese Application No. 096151464 mailed Sep. 19, 2011.
English Translation of Taiwanese Office Action in commonly owned Taiwanese Application No. 096151464 mailed Sep. 19, 2011.
Office Action in commonly owned U.S. Appl. No. 12/478,867 mailed Nov. 22, 2010, pp. 1-13.
Final Office Action in commonly owned U.S. Appl. No. 12/478,867 mailed Apr. 19, 2011, pp. 1-11.
Advisory Action in commonly owned U.S. Appl. No. 12/478,867 mailed Jul. 28, 2011, pp. 1-6.
Office Action in commonly owned U.S. Appl. No. 12/478,867 mailed Dec. 14, 2011, pp. 1-18.

* cited by examiner

*Primary Examiner* — Jennifer Chriss
*Assistant Examiner* — Thomas Mangohig
(74) *Attorney, Agent, or Firm* — Additon, Higgins, Pendleton & Ashe, P.A.

(57) ABSTRACT

A thermoplastic polycarbonate resin composition which can have excellent light stability and flame retardancy includes about 100 parts by weight of a polycarbonate base resin (A); about 0.1 to about 5 parts by weight of a polyorganosiloxane-containing graft copolymer (B); about 5 to about 50 parts by weight of titanium dioxide (C); and about 0.1 to about 5 parts by weight of a fluorinated polyolefin-based resin (D). The thermoplastic polycarbonate resin composition may further include about 5 to about 50 parts by weight of a filler (E).

17 Claims, No Drawings

POLYCARBONATE RESIN COMPOSITION WITH EXCELLENT FLAME RETARDANCY AND LIGHT STABILITY

CROSS REFERENCE TO RELATED APPLICATIONS

This application claims priority from Korean Patent Application No. 2008-130220 filed on Dec. 19, 2008 in the Korean Intellectual Property Office, the disclosure of which is incorporated herein by reference in its entirety.

FIELD OF THE INVENTION

The present invention relates to a polycarbonate resin composition that can have excellent light stability and flame retardancy.

BACKGROUND OF THE INVENTION

Polycarbonate resins are engineering plastics having excellent mechanical properties, high heat resistance and transparency and are employed in a variety of applications, including office automation systems, electric and electronic components, building materials, and the like. Polycarbonate resins used in liquid crystal display (LCD) backlight units in electric and electronic components require high light reflectance, light stability and color fixation properties, and require high fluidity due to slimming and thinning of products including television sets, monitors, and notebooks.

When polycarbonate resins are used in LCD backlight units, the resins are often colored to a high whiteness and used as backlight frames to reflect backlight with minimal loss of backlight. Titanium dioxide ($TiO_2$), which has the highest refractive index in air, is primarily used as a white pigment to color the resins to a high whiteness.

In order to impart flame retardancy to such a resin composition, halogen-based retardants and antimony compounds or phosphorus-based compounds have conventionally been used. However, demand for resins which do not include halogen-based retardants has rapidly increased recently due to problems associated with the same, such as the generation of gases harmful to humans during combustion.

Phosphoric acid ester-based flame retardants are examples of typical phosphorus based flame retardants used in resin compositions. Phosphoric acid ester-based flame retardants, however, can cause a so-called "juicing" phenomenon in which flame retardants migrate and deposit onto a surface of molding equipment during a molding process, and can rapidly lower heat resistance in resin compositions.

Metal salts of sulfonic acid can also be used as an alternative to halogen based flame retardants to impart high heat resistance and flame retardancy. Flame retardancy of the resin composition, however, can deteriorate, and resins can decompose at high temperature to result in the deterioration of mechanical properties of the resin composition if a large amount of titanium dioxide is used to color the resins to high whiteness.

SUMMARY OF THE INVENTION

The present invention provides a polycarbonate resin composition that can have excellent light stability and flame retardancy. The thermoplastic polycarbonate resin composition can also have excellent physical properties such as impact resistance, heat resistance, workability, external appearance, and the like.

The present invention further provides a molded article manufactured using the polycarbonate resin composition.

The thermoplastic polycarbonate resin composition of the invention can include about 100 parts by weight of a polycarbonate resin (A); about 0.1 to about 5 parts by weight of a polyorganosiloxane-containing graft copolymer (B); about 5 to about 50 parts by weight of titanium dioxide (C); and about 0.1 to about 5 parts by weight of a fluorinated polyolefin-based resin (D). Because the polycarbonate resin composition does not require a halogen-based flame retardant, the present invention can prevent the generation of harmful halogen-based harmful gases. Further, the polycarbonate composition can exhibit excellent light stability and flame retardancy without also exhibiting deteriorated mechanical properties or heat resistance of the resin by using the polyorganosiloxane-containing graft copolymer, titanium dioxide and fluorinated olefin-based resin in the ratios disclosed herein. For example, the weight ratio of the polyorganosiloxane-containing graft copolymer (B) to titanium dioxide (C) can be about 1:5 to about 1:40.

The thermoplastic polycarbonate resin composition according to the present invention may further comprise about 5 to about 50 parts by weight of a filler (E).

Further, the present invention provides pellets obtained by extruding the thermoplastic polycarbonate resin composition according to the present invention.

Furthermore, the present invention provides LCD backlight components obtained by molding the thermoplastic polycarbonate resin composition according to the present invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic polycarbonate resin composition that can have excellent light stability and flame retardancy according to the present invention comprises about 100 parts by weight of a polycarbonate resin (A); about 0.1 to about 5 parts by weight of a polyorganosiloxane-containing graft copolymer (B); about 0.1 to about 50 parts by weight of titanium dioxide (C); and about 0.1 to about 5 parts by weight of a fluorinated polyolefin-based resin. The polycarbonate resin composition of the invention can prevent the generation of harmful halogenated gases and can have excellent light stability and flame retardancy without deteriorating mechanical properties or heat resistance of the resin by adding a polyorganosiloxane-containing graft copolymer, titanium dioxide and a fluorinated olefin-based resin to a polycarbonate base resin at a proper ratio.

Hereinafter, the respective components of the thermoplastic polycarbonate resin composition according to the present invention will be described more in detail.

Polycarbonate Resins (A)

The polycarbonate resin (A) can be an aromatic polycarbonate resin prepared by reacting one or more diphenols represented by the following Chemical Formula I with phosgene, halogen formate, or carbonic acid diester.

[Chemical Formula 1]

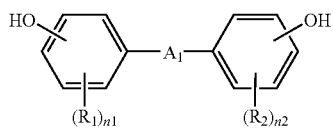

wherein:

$A_1$ is a single bond, substituted or unsubstituted C1-C5 alkylene, substituted or unsubstituted C1-C5 alkylidene, substituted or unsubstituted C3-C6 cycloalkylene, substituted or unsubstituted C5-C6 cycloalkylidene, CO, S, or $SO_2$;

each of $R_1$ and $R_2$ is independently substituted or unsubstituted C1-C30 alkyl or substituted or unsubstituted C6-C30 aryl; and each of $n_1$ and $n_2$ is independently an integer of 0 to 4.

As used herein, the term "substituted" means that a hydrogen atom is substituted by a substituent comprising halogen, C1-C30 alkyl, C1-C30 haloalkyl, C6-C30 aryl, C2-C30 heteroaryl, C1-C20 alkoxy, or a combination thereof.

Exemplary compounds represented by the foregoing Chemical Formula I may comprise without limitation 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. In exemplary embodiments, 2,2-bis-(4-hydroxyphenyl)-propane, 2,2-bis-(3,5-dichloro-4-hydroxyphenyl)-propane, or 1,1-bis-(4-hydroxyphenyl)-cyclohexane may be used. In another exemplary embodiment, 2,2-bis-(4-hydroxyphenyl)-propane (also referred to as bisphenol-A) may be used.

The polycarbonate resin may have a weight-average molecular weight (Mw) of about 10,000 to about 200,000 g/mol, for example about 15,000 to about 80,000 g/mol, but the polycarbonate resins are not necessarily limited thereto.

The polycarbonate resin can include linear polycarbonate resins, branched polycarbonate resins, polyester carbonate copolymers, and the like, and copolymers and combinations thereof, such as disclosed in U.S. Pat. Nos. 2,999,846, 3,028,365, 3,271,367, and 4,452,968, the entire disclosure of each of which is incorporated herein by reference.

The linear polycarbonate resins may be a bisphenol A-based polycarbonate resin, and the branched polycarbonate resins may be prepared by reacting polyfunctional aromatic compounds, such as trimellitic anhydride and trimellitic acid, with dihydroxyphenol and a polycarbonate precursor. The polyester carbonate copolymers may be prepared by reacting difunctional carboxylic acid with a dihydric phenol and a carbonate precursor.

The polycarbonate resin may be a homopolymer, a copolymer, or a combination thereof.

Furthermore, the polycarbonate resin can be partly or entirely replaced with an ester precursor, e.g., an aromatic polyester-carbonate resin obtained by a polymerization reaction in the presence of difunctional carboxylic acid.

Polyorganosiloxane-Containing Graft Copolymer (B)

In an exemplary embodiment of the present invention, the polyorganosiloxane-containing graft copolymer (B) comprises a core comprising polyorganosiloxane and a vinyl-based monomer graft copolymerized with the core to form a shell.

In another exemplary embodiment of the present invention, the polyorganosiloxane-containing graft copolymer (B) may be a polymer prepared by polymerizing about 0.5 to about 10% by weight of a vinyl monomer (B-2) comprising about 100 to about 50% of a polyfunctional monomer (B-2-a) having two or more polymerizable unsaturated bonds and about 0 to about 50% of another monomer (B-2-b) copolymerizable with the polyfunctional monomer (B-2-a) in the presence of about 40 to about 90% by weight of polyorganosiloxane particles (B-1). The resultant polymer can then be additionally polymerized with about 5 to about 50% by weight of a vinyl monomer (B-3). For example, the polyorganosiloxane-containing graft copolymer (B) can include a vinyl monomer grafted on a core structure of rubber to form a hard shell.

The polyorganosiloxane particles (B-1) can have an average particle diameter of about 0.008 to about 0.6 μm, measured by a light scattering method or electron microscopic observation as known in the art, for example about 0.01 to about 0.2 μm, and as another example about 0.01 to about 0.15 μm.

Polyorganosiloxane particles with an average particle diameter of less than about 0.008 μm can be difficult to work with while polyorganosiloxane particles with an average particle diameter of more than about 0.6 μm can lower flame retardancy.

In order to improve the flame retardancy and impact resistance of the resin composition, the polyorganosiloxane particles (B-1) may comprise a material insoluble to toluene in an amount of about 95% or less, for example about 50% or less, as another example about 20% or less (measured by impregnating about 0.5 g of the particles with about 80 ml of toluene at about 23° C. for 24 hours). The polyorganosiloxane particles (B-1) may also comprise modified polyorganosiloxane particles including about 5% or less of other copolymers, e.g., about 5% or less of butyl polyacrylate, butyl acrylate-styrene copolymer, or the like, in addition to particles made from polyorganosiloxane.

The polyorganosiloxane particles (B-1) may be prepared from a cyclosiloxane monomer. Exemplary cyclosiloxane monomers include without limitation hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof. One or more curing agents can also be used with the siloxanes to prepare silicone-based rubbers. Examples of the curing agents may include without limitation trimethoxymethylsilane, triethoxyphenylsilane, tetramethoxysilane, tetraethoxysilane, and the like, and combinations thereof. The curing agents may be used singly or in the form of combinations of two or more thereof.

Examples of the polyfunctional monomer (B-2-a) may include without limitation allyl methacrylate, triallyl cyanurate, triallyl isocyanurate, diallyl phthalate, ethylene glycol dimethacrylate, 1,3-butylene glycol dimethacrylate, divinyl benzene, and the like, and combinations thereof. The polyfunctional monomer (B-2-a) may be used singly or in the form of combinations of two or more thereof.

Examples of the copolymerizable monomer (B-2-b) may include without limitation aromatic vinyl monomers, such as styrene, α-methylstyrene, para-methylstyrene, para-butylstyrene and the like, vinyl cyanide monomers, such as acrylonitrile, methacrylonitrile and the like, acrylate ester-based monomers, such as methyl acrylate, ethyl acrylate, propyl acrylate, butyl acrylate, 2-ethylhexyl acrylate, glycidyl acrylate, hydroxyethyl acrylate, hydroxybutyl acrylate, methyl methacrylate, ethyl methacrylate, butyl methacrylate, lauryl methacrylate, glycidyl methacrylate, hydroxyethyl methacrylate and the like, and carboxyl group-containing vinyl monomers, such as acrylic acid, maleic acid and the like, and combinations thereof. The copolymerizable monomer (B-2-b) may also be used singly or in the form of combinations of two or more thereof.

The vinyl monomer (B-2) comprising the polyfunctional monomer (B-2-a) and the copolymerizable monomer (B-2-b) is used to improve flame retardancy and impact resistance. The vinyl monomer (B-2) can include about 100 to about 50%, for example about 100 to about 80%, and as another example about 100 to about 90%, of a polyfunctional monomer (B-2-a) comprising two or more polymerizable unsaturated bonds in a molecule, and about 0 to about 50%, for example about 0 to about 20%, and as another example about 0 to about 10%, of a copolymerizable monomer (B-2-b). When too small of an amount of the polyfunctional monomer (B-2-a) or too large of an amount of the copolymerizable monomer (B-2-b) is used, impact resistance of the final polyorganosiloxane-containing graft copolymer may deteriorate.

Examples of the vinyl monomer (B-3) may include without limitation monomers mentioned herein as examples of the copolymerizable monomer (B-2-b) of the vinyl monomer (B-2). Exemplary vinyl monomers (B-3) can include without limitation aromatic vinyl monomers, such as styrene, α-methylstyrene, para-methylstyrene, para-butylstyrene and the like, vinyl cyanide monomers, such as acrylonitrile, methacrylonitrile and the like, acrylate ester-based monomers, such as methyl acrylate, ethyl acrylate, propyl acrylate, butyl acrylate, 2-ethylhexyl acrylate, glycidyl acrylate, hydroxyethyl acrylate, hydroxybutyl acrylate, methyl methacrylate, ethyl methacrylate, butyl methacrylate, lauryl methacrylate, glycidyl methacrylate, hydroxyethyl methacrylate and the like, and carboxyl group-containing vinyl monomers, such as acrylic acid, maleic acid and the like, and combinations thereof. In exemplary embodiments of the invention, the vinyl monomer (B-3) may include without limitation polymethylmethacrylate, polybutylacrylate, polybutylmethacrylate, polystyrene, polyacrylonitrile, or a combination thereof.

The vinyl monomer (B-3) may be used singly or in the form of combinations of two or more thereof.

The vinyl monomer (B-3) can promote compatibility of the graft copolymer with a thermoplastic resin and uniform dispersion of the graft copolymer in the thermoplastic resin when mixing the graft copolymer with the thermoplastic resin and then improving flame retardancy and impact resistance of the mixture.

The vinyl monomer (B-3) can have a polymer solubility parameter of about 9.15 to about 10.15 cal/cm³, for example about 9.17 to about 10.10 cal/cm³, and as another example about 9.20 to about 10.05 cal/cm³.

The polyorganosiloxane-containing graft copolymer can include the vinyl monomer (B-2) grafted to the polyorganosiloxane particles (B-1), and the vinyl monomer (B-3) grafted to a polymer formed by the polyorganosiloxane particles (B-1) and vinyl monomer (B-2). The resultant polyorganosiloxane-containing graft copolymer can have a low content of free polymer produced by the graft polymerization.

In order to obtain excellent flame retardancy, the polyorganosiloxane-containing graft copolymer can further include a material insoluble in acetone in the amount of about 80% or more, for example about 85% or more, which is determined by impregnating 1 g of the polyorganosiloxane-containing graft copolymer with 80 ml of acetone at about 23° C. for about 48 hours.

The core of the polyorganosiloxane-containing graft copolymer (B) can include a rubber polymer including silicone in an amount of about 10% by weight or more and about 90% by weight or less. The flame retardancy may deteriorate if the amount of silicone is less than about 10% by weight, in which case it may be difficult to obtain the degree of flame retardancy required for many products. Impact strength can deteriorate, however, if the amount of silicone is more than about 90% by weight.

The thermoplastic polycarbonate resin composition can include the polyorganosiloxane-containing graft copolymer (B) in amount of about 0.1 to about 5 parts by weight, based on about 100 parts by weight of the polycarbonate resin (A). If the polyorganosiloxane-containing graft copolymer is used in an amount of less than about 0.1 part by weight, flame retardancy may deteriorate. If the polyorganosiloxane-containing graft copolymer is used in an amount of more than about 5 parts by weight, manufacturing costs may increase and heat resistance and flame retardancy may deteriorate.

Titanium Dioxide (C)

Conventional titanium dioxide may be used as the titanium dioxide in the present invention, and the invention is not limited to any particular preparation method and/or particle diameter of titanium dioxide. Titanium dioxide having a surface treated with an inorganic surface treatment agent or an organic surface treatment agent may be used in the present invention.

Examples of the inorganic surface treatment agent may include without limitation aluminum oxide (alumina, $Al_2O_3$), silicon dioxide (silica, $SiO_2$), zirconia (zirconium dioxide, $ZrO_2$), sodium silicate, sodium aluminate, sodium aluminum silicate, zinc oxide, mica, and the like, and combinations thereof.

Examples of the organic surface treatment agent may include without limitation polydimethylsiloxane, trimethylpropane (TMP), pentaerythritol, and the like, and combinations thereof.

The inorganic or organic surface treatment agent can be used in an amount of about 0.3 part by weight or less, for example about 0.01 to about 0.3 part by weight, based on about 100 parts by weight of titanium dioxide, to treat the surface of titanium dioxide.

In the present invention, titanium dioxide coated with less than about 2 parts by weight of alumina ($Al_2O_3$), as the inorganic surface treatment agent, based on about 100 parts by weight of titanium dioxide may be used. For example, the surface of titanium dioxide can be treated with about 0.01 to about 2 parts by weight of alumina ($Al_2O_3$).

Titanium dioxide having its surface treated with alumina may be used after being further modified with an inorganic surface treatment agent, such as but not limited to silicon dioxide, zirconium dioxide, sodium silicate, sodium aluminate, sodium aluminum silicate, mica and the like, and combinations thereof, or an organic surface treatment agent, such as but not limited to polydimethylsiloxane, trimethylpropane (TMP), pentaerythritol and the like, and combinations thereof.

The thermoplastic polycarbonate resin composition can include the titanium dioxide (C) in an amount range of about 0.1 to about 50 parts by weight, for example about 5 to about 30 parts by weight, based on about 100 parts by weight of the polycarbonate resin (A). If the thermoplastic polycarbonate resin composition includes titanium dioxide (C) in an amount less than about 0.1 part by weight, light stability may deteriorate. If the thermoplastic polycarbonate resin composition includes titanium dioxide (C) in an amount greater than about 50 parts by weight, impact resistance may deteriorate.

The thermoplastic polycarbonate resin composition according to the present invention may include a weight ratio of the polyorganosiloxane-containing graft copolymer (B) to the titanium dioxide (C) of about 1:5 to about 1:40. If the weight ratio of the polyorganosiloxane-containing graft copolymer (B) to the titanium dioxide (C) is less than about 1:5, i.e., if the amount of the polyorganosiloxane-containing graft copolymer (B) is relatively large compared to that of the titanium dioxide (C), or the amount of the titanium dioxide (C) is relatively small compared to that of the polyorganosiloxane-containing graft copolymer (B), light stability may deteriorate. If the weight ratio of the polyorganosiloxane-containing graft copolymer (B) to the titanium dioxide (C) is more than about 1:40, i.e., if the amount of the polyorganosiloxane-containing graft copolymer (B) is relatively small compared to that of the titanium dioxide (C), or the amount of the titanium dioxide (C) is relatively large compared to that of the polyorganosiloxane-containing graft copolymer (B), impact resistance may deteriorate.

Fluorinated Polyolefin-Based Resins (D)

Exemplary fluorinated polyolefin-based resins may include without limitation polytetrafluoroethylene, polyvinylidenefluoride, tetrafluoroethylene/vinylidenefluoride copolymer, tetrafluoroethylene/hexafluoropropylene copolymer, ethylene/tetrafluoroethylene copolymer, and the like, and combinations thereof. The fluorinated polyolefin-based resins may be used singly or in the form of combinations of two or more thereof.

The fluorinated polyolefin-based resin can prevent a dripping phenomenon of the resin by forming fibrillar networks in the resin to increase the contraction ratio of the resin and lower the melt viscosity of the resin during combustion.

The fluorinated polyolefin-based resin may be prepared by well-known polymerization methods. For example, the fluorinated polyolefin-based resin may be prepared in a water-soluble medium containing free radical-forming catalysts such as sodium peroxydisulfate, potassium peroxydisulfate and ammonium peroxydisulfate under the conditions of a pressure of about 7 to about 71 kg/cm$^2$ and a temperature of about 0 to about 200° C., for example about 20 to about 100° C.

The fluorinated polyolefin-based resin may be used in an emulsion state or powder state. If a fluorinated polyolefin-based resin in an emulsion state is used, the production process can become complicated although dispersibility in the total resin composition is good. Accordingly, a fluorinated polyolefin-based resin in a powder state may be used if the fluorinated polyolefin-based resin can be properly dispersed in the total resin composition to form fibrillar networks.

Polytetrafluoroethylene having a particle size of about 0.05 to about 1,000 µm and a specific gravity of about 1.2 to about 2.3 g/cm$^3$ may be used as the fluorinated polyolefin-based resin.

The thermoplastic polycarbonate resin composition may include the fluorinated polyolefin-based resin (D) in an amount of 0.1 to about 5 parts by weight, based on about 100 parts by weight of the polycarbonate resin (A). If the amount of the fluorinated polyolefin-based resin (D) is less than about 0.1 part by weight, flame retardancy may deteriorate. If the amount of the fluorinated polyolefin-based resin (D) is more than about 5 parts by weight, however, impact strength may deteriorate.

Filler (E)

Fillers with various particle shapes may be further added to the composition in order to increase mechanical properties, heat resistance, dimensional stability and the like of the composition according to the present invention.

Both organic and inorganic fillers, which are conventionally used in polycarbonate compositions, may be used in the present invention. Exemplary fillers may include without limitation carbon fibers, glass fibers, glass beads, glass flakes, carbon black, talc, clay, kaolin, mica, calcium carbonate, and the like, and combinations thereof.

The glass fibers may have various sectional shapes in addition to a circular sectional shape according to special uses of the glass fibers. In the present invention, the glass fibers may have any type of sectional shapes.

The thermoplastic polycarbonate resin composition may include the filler in an amount of about 5 to about 50 parts by weight, based on about 100 parts by weight of the polycarbonate resin (A). Mechanical stiffness may deteriorate if the filler is used in an amount of less than about 5 parts by weight while impact resistance of the resin composition may deteriorate if the filler is used in an amount of more than about 50 parts by weight.

The thermoplastic polycarbonate resin composition of the present invention may further comprise one or more other additives and/or fillers. Exemplary additives and/or fillers include without limitation ultraviolet light stabilizers, fluorescent whitening agents, lubricants, release agents, nucleating agents, antistatic agents, stabilizers, reinforcing agents, inorganic additives, coloring agents such as pigments and dyestuffs, and the like, and combinations thereof, depending on the respective uses of the resin composition.

The ultraviolet stabilizer serves to inhibit the resin composition from changing color and exhibiting deteriorated light reflectivity when the resin composition is irradiated with UV light. Exemplary ultraviolet stabilizers may include without limitation benzotriazole-based compounds, benzophenone-based compounds, triazine-based compounds, and the like, and combinations thereof.

The fluorescent whitening agent can improve light reflectance of the polycarbonate resin composition. Exemplary fluorescent whitening agents may include without limitation stilbene-bisbenzoxazole derivatives, such as 4-(benzoxazole-2-il)-4'-(5-methylbenzoxazole-2-il)stilbene, 4,4'-bis(benzoxazole-2-il)stilbene, and the like, and combinations thereof.

Exemplary release agents may include without limitation fluorine-containing polymers, silicone oils, metal salts of stearic acid, metal salts of montanic acid, ester waxes of montanic acid, polyethylene waxes, and the like, and combinations thereof. Exemplary nucleating agents may include without limitation talc, clay, and the like, and combinations thereof.

Both organic and inorganic fillers may be used as the fillers. Exemplary fillers may include without limitation carbon fibers, glass fibers, glass beads, glass flakes, carbon black, talc, clay, kaolin, mica, calcium carbonate, and the like, and combinations thereof.

The present invention will be well understood by the following examples. The following examples of the present invention are only for illustrative purposes and are not construed as being limited to the scope of the present invention defined by the appended claims.

EXAMPLES

A polycarbonate resin (A), a polyorganosiloxane-containing graft copolymer (B), titanium dioxide (C), a fluorinated polyolefin-based resin (D), a sulfonic acid metal salt-based flame retardant (E), and a phosphoric acid ester-based flame retardant (F) used in the Examples of the present invention and the Comparative Examples are as follows.

Polycarbonate Resin (A)

SC-1080 manufactured by Cheil Industries Inc. of the Republic of Korea, a bisphenol-A type polycarbonate with a weight-average molecular weight of about 25,000 g/mol, is used in the Examples of the present invention and the Comparative Examples.

Silicone-Based Core-Shell Graft Copolymer (B)

Kaneace MR-01 manufactured by Kaneka Corporation is used in the Examples of the present invention and the Comparative Examples.

Titanium Dioxide (C)

Kronoss 2233 manufactured by Kronos Inc. is used in the Examples of the present invention and the Comparative Examples.

Fluorinated Polyolefin-Based Resin (D)

Teflon (Registered Trademark) CFP 614A manufactured by DuPont is used in the Examples of the present invention and the Comparative Examples.

Filler (E)

Glass fiber CSF 3PE 936S manufactured by Nittobo Co., Ltd. is used in the Examples of the present invention and the Comparative Examples.

Rubber Modified Vinyl-Based Graft Copolymer (F)

Metablene C223A manufactured by Mitsubishi Rayon Co., Ltd., a methylmethacrylate-butadiene-styrene copolymer generally frequently used as an impact modifier of polycarbonate, is used in the Comparative Examples.

Sulfonic Acid Metal Salt-Based Flame Retardant (G)

FR-2025 manufactured by 3M Company of the U.S. is used in the Comparative Examples.

Phosphoric Acid Ester-Based Flame Retardant (H)

PX-200 manufactured by Daihachi Chemical Industry Co., Ltd. of Japan is used in the Comparative Examples.

Examples 1 to 6 and Comparative Examples 1 to 16

A resin composition is prepared in the form of chips by adding the respective components in amounts according to the following Table 1 and then melting and kneading the components in a twin-screw melt extruder heated to a temperature of about 240 to about 280° C. After drying the obtained chips at a temperature of about 130° C. for about 5 hours or more, specimens for measuring flame retardancy and specimens for evaluating mechanical properties are manufactured from the dried chips using a screw type injection machine heated to a temperature of about 240 to about 280° C.

TABLE 1

| | Example | | | Comparative Example | | | | | | | | | |
|---|---|---|---|---|---|---|---|---|---|---|---|---|---|
| Component | 1 | 2 | 3 | 1 | 2 | 3 | 4 | 5 | 6 | 7 | 8 | 9 | 10 |
| Polycarbonate (A) | 100 | 100 | 100 | 100 | 100 | 100 | 100 | 100 | 100 | 100 | 100 | 100 | 100 |
| Polyorganosiloxane-containing graft copolymer (B) | 1 | 3 | 3 | — | — | 1 | 3 | 6 | 1 | — | — | — | — |
| Titanium dioxide (C) | 15 | 15 | 30 | 15 | 30 | — | — | 15 | 60 | 15 | 15 | 15 | 15 |
| Fluorinated polyolefin-based resin (D) | 0.3 | 0.3 | 0.3 | 0.3 | 0.3 | 0.3 | 0.3 | 0.3 | 0.3 | 0.3 | 0.3 | 0.3 | 0.3 |
| Sulfonic acid metal salt-based flame retardant (G) | — | — | — | — | — | — | — | — | — | — | 0.1 | 1 | — | — |
| Phosphoric acid ester-based flame retardant (H) | — | — | — | — | — | — | — | — | — | — | — | — | 1 | 7 |

TABLE 2

| | Example | | | Comparative Example | | | | | |
|---|---|---|---|---|---|---|---|---|---|
| Component | 4 | 5 | 6 | 11 | 12 | 13 | 14 | 15 | 16 |
| Polycarbonate (A) | 100 | 100 | 100 | 100 | 100 | 100 | 100 | 100 | 100 |
| Polyorganosiloxane-containing graft copolymer (B) | 1 | 3 | 1 | — | — | 6 | 1 | 1 | — |
| Titanium dioxide (C) | 20 | 20 | 30 | 20 | 30 | 20 | — | 60 | 20 |
| Fluorinated polyolefin-based resin (D) | 0.3 | 0.3 | 0.3 | 0.3 | 0.3 | 0.3 | 0.3 | 0.3 | 0.3 |
| Filler (E) | 20 | 20 | 20 | 20 | 20 | 20 | 20 | 20 | 20 |
| Rubber modified vinyl-based graft copolymer (F) | — | — | — | — | — | — | — | — | 1 |

After manufacturing specimens of the compositions represented in the foregoing Tables 1 and 2, flame retardancy, Vicat softening point, impact strength, and light stability of the specimens are evaluated, and the evaluation results are represented in the following Tables 3 and 4.

Methods for Evaluating Physical Properties (1) Flame retardancy is measured on specimens in accordance with UL 94 vertical test.

(2) Vicat Softening Temperature (VST) is measured on specimens in accordance with ASTM D1525.

(3) Impact strength is measured on specimens in accordance with ASTM D256.

(4) Light stability is evaluated by measuring yellow indices by a Minolta 3600D CIE Lab. spectrophotometer before and after irradiating specimens with UV light using a UV-Condensation machine in accordance with ASTM G53.

of the present invention, and flame retardancy and impact strength are deteriorated in Comparative Example 6 in which the titanium dioxide (C) is used in an amount outside that of the present invention. Additionally, the flame retardancy is lowered in Comparative Examples 7 and 8 in which the sulfonic acid metal salt-based flame retardant (G) is used, and flame retardancy and impact strength are also lowered in Comparative Examples 9 and 10 in which the phosphoric acid ester-based flame retardant (H) is used.

Furthermore, the results of Table 4 demonstrate that the thermoplastic polycarbonate resin compositions of Examples 4 to 6 according to the present invention have excellent light stability and flame retardancy while maintaining superior mechanical properties. Specifically, the results confirm that flame retardancy deteriorates when the polyorganosiloxane-containing graft copolymer (B) and the titanium dioxide (C)

TABLE 3

| | | Example | | | Comparative Example | | | | | | | | | |
|---|---|---|---|---|---|---|---|---|---|---|---|---|---|---|
| | | 1 | 2 | 3 | 1 | 2 | 3 | 4 | 5 | 6 | 7 | 8 | 9 | 10 |
| Flame retardancy | 1.0 mm | V-0 | V-0 | V-0 | Fail | Fail | Fail | Fail | Fail | V-1 | Fail | Fail | Fail | V-1 |
| VST (° C.) | | 142 | 139 | 140 | 142 | 141 | 137 | 134 | 139 | 142 | 139 | 136 | 139 | 120 |
| Impact strength (kgf · cm/cm) | | 55 | 60 | 54 | 21 | 14 | 75 | 80 | 70 | 16 | 17 | 14 | 18 | 14 |
| Light stability (Yellowness) | Before UV irradiation | 3.2 | 3.5 | 2.9 | 3.0 | 2.8 | 3.3 | 3.5 | 4.3 | 2.7 | 3.1 | 3.2 | 3.5 | 4.3 |
| | After 72 hour UV irradiation | 28.5 | 28.9 | 22.7 | 28.3 | 22.3 | 37.9 | 39.4 | 30.5 | 19.2 | 28.3 | 28.5 | 29.1 | 31.2 |
| | Yellowness difference | 25.4 | 25.4 | 19.8 | 25.3 | 19.5 | 34.6 | 35.9 | 26.2 | 16.5 | 25.2 | 25.3 | 25.5 | 26.9 |

TABLE 4

| | | Example | | | Comparative Example | | | | | |
|---|---|---|---|---|---|---|---|---|---|---|
| | | 4 | 5 | 6 | 11 | 12 | 13 | 14 | 15 | 16 |
| Flame retardancy | 1/16" | V-0 | V-0 | V-0 | Fail | Fail | Fail | Fail | V-1 | Fail |
| VST (° C.) | | 139 | 138 | 137 | 138 | 139 | 133 | 134 | 138 | 137 |
| Impact strength (kgf · cm/cm) | | 11 | 13 | 10 | 6 | 5 | 16 | 10 | 5 | 9 |
| Flexural modulus (kgf/cm$^2$) | | 46,000 | 45,000 | 48,000 | 46,000 | 46,000 | 41,000 | 35,000 | 54,000 | 46,000 |
| Light stability (Yellowness) | Before UV irradiation | 1.0 | 1.2 | 1.0 | 1.2 | 1.0 | 1.3 | 1.3 | 1.2 | 1.1 |
| | After 72 hour UV irradiation | 23.3 | 23.8 | 23.2 | 23.2 | 22.7 | 24.2 | 27.4 | 19.5 | 23.5 |
| | Yellowness difference | 22.6 | 22.6 | 21.2 | 22.0 | 21.7 | 22.9 | 26.1 | 18.3 | 22.4 |

It can be seen from the results of the foregoing Table 3 that the thermoplastic polycarbonate resin compositions of Examples 1 to 3 according to the present invention have excellent impact strength, light stability and flame retardancy without deteriorating heat resistance. In contrast, flame retardancy deteriorates when the polyorganosiloxane-containing graft copolymer (B) and the titanium dioxide (C) are not used together or they are used in an amount outside that of the present invention. For example, flame retardancy is deteriorated in Comparative Examples 1 and 2 in which the polyorganosiloxane-containing graft copolymer (B) is not used, and flame retardancy and light stability are deteriorated in Comparative Examples 3 and 4 in which the titanium dioxide (C) is not used. Further, flame retardancy is deteriorated in Comparative Example 5 in which the polyorganosiloxane-containing graft copolymer (B) is used in an amount outside that are not used together, or are used in an amount outside that of the present invention. For example, flame retardancy deteriorates in Comparative Examples 11 and 12 in which the polyorganosiloxane-containing graft copolymer (B) is not used, and flame retardancy, flexural modulus, and light stability are all deteriorated in Comparative Example 14 in which titanium dioxide (C) is not used. In addition, flame retardancy is deteriorated while impact strength is improved in Comparative Example 13 in which the polyorganosiloxane-containing graft copolymer (B) is used in the amount outside that of the present invention, and flame retardancy and impact strength are deteriorated in Comparative Example 5 in which titanium dioxide (C) is used in an amount outside that of the present invention. Further, flame retardancy is lowered in Comparative Example 6 in which the rubber modified vinyl-based graft copolymer is used instead of the polyorganosiloxane-containing graft copolymer (B).

The present invention accordingly can provide a thermoplastic polycarbonate resin composition which can have excellent light stability and flame retardancy, which can be environmentally friendly since halogen-based gases are prevented from being generated and which can be useful as a material for electric and electronic components in view of the excellent flame retardancy and mechanical properties.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic polycarbonate resin composition consisting essentially of:
    (A) about 100 parts by weight of a polycarbonate base resin;
    (B) about 0.1 to about 5 parts by weight of a polyorganosiloxane-containing graft copolymer, wherein the polyorganosiloxane-containing graft copolymer (B) is formed of a polyorganosiloxane-containing core and a vinyl-based monomer graft copolymerized to the core to form a shell;
    (C) about 5 to about 50 parts by weight of titanium dioxide;
    (D) about 0.1 to about 5 parts by weight of a fluorinated polyolefin-based resin; and
    optionally about 5 to about 50 parts by weight of a filler (E), wherein the composition does not include a sulfonic acid metal salt flame retardant.

2. The thermoplastic polycarbonate resin composition of claim 1, wherein the polyorganosiloxane-containing graft copolymer (B) is present in an amount of about 0.1 to 3 parts by weight.

3. The thermoplastic polycarbonate resin composition of claim 1, wherein the polyorganosiloxane-containing graft copolymer (B) and the titanium dioxide (C) are present in a weight ratio of the polyorganosiloxane-containing graft copolymer (B) to the titanium dioxide (C) of about 1:5 to about 1:40.

4. The thermoplastic polycarbonate resin composition of claim 1, wherein the polyorganosiloxane-containing graft copolymer (B) is prepared by polymerizing:
    (B-1) about 40 to about 90% by weight of polyorganosiloxane particles;
    (B-2) about 0.5 to about 10% by weight of a vinyl monomer selected from the group consisting of (B-2-a) about 100 to about 50% by weight of a polyfunctional monomer having two or more polymerizable unsaturated bonds and (B-2-b) about 0 to about 50% by weight of a monomer copolymerizable with the monomer (B-2-a); and
    (B-3) about 5 to about 50% by weight of a vinyl monomer.

5. The thermoplastic polycarbonate resin composition of claim 4, wherein the polyorganosiloxane particles (B-1) have an average particle diameter of about 0.008 to about 0.6 μm measured by a light scattering method or electron microscopic observation.

6. The thermoplastic polycarbonate resin composition of claim 4, wherein the polyorganosiloxane particles (B-1) are prepared from cyclosiloxane.

7. The thermoplastic polycarbonate resin composition of claim 4, wherein the polyfunctional monomer (B-2-a) is selected from the group consisting of allyl methacrylate, triallyl cyanurate, triallyl isocyanurate, diallyl phthalate, ethylene glycol dimethacrylate, 1,3-butylene glycol dimethacrylate, divinyl benzene, and combinations thereof.

8. The thermoplastic polycarbonate resin composition of claim 4, wherein the copolymerizable monomer (B-2-b) is selected from the group consisting of aromatic vinyl monomers, vinyl cyanide monomers, acrylate ester-based monomers, carboxyl group-containing vinyl monomers, and combinations thereof.

9. The thermoplastic polycarbonate resin composition of claim 4, wherein the vinyl monomer (B-3) has a solubility parameter of about 9.15 to about 10.15 $(cal/cm^3)^{1/2}$.

10. The thermoplastic polycarbonate resin composition of claim 4, wherein the vinyl monomer (B-3) is selected from the group consisting of aromatic vinyl monomers, vinyl cyanide monomers, acrylate ester-based monomers, carboxyl group-containing vinyl monomers, and combinations thereof.

11. The thermoplastic polycarbonate resin composition of claim 1, wherein the titanium dioxide (C) is surface-treated with an inorganic surface treatment agent or an organic surface treatment agent.

12. The thermoplastic polycarbonate resin composition of claim 11, wherein the titanium dioxide (C) is surface-treated with:
    about 0.3 part by weight or less of an inorganic surface treatment agent selected from the group consisting of silicon dioxide, zirconium dioxide, sodium silicate, sodium aluminate, sodium aluminum silicate, mica, and combinations thereof, based on about 100 parts by weight of the titanium dioxide (C); or
    about 0.3 part by weight or less of an organic surface treatment agent selected from the group consisting of polydimethylsiloxane, trimethylpropane (TMP), pentaerythritol, and combinations thereof, based on about 100 parts by weight of the titanium dioxide (C).

13. The thermoplastic polycarbonate resin composition of claim 1, wherein the fluorinated polyolefin-based resin (D) is selected from the group consisting of polytetrafluoroethylene, polyvinylidenefluoride, tetrafluoroethylene/vinylidenefluoride copolymer, tetrafluoroethylene/hexafluoropropylene copolymer, ethylene/tetrafluoroethylene copolymer, and combinations thereof.

14. The thermoplastic polycarbonate resin composition of claim 1, wherein the filler (E) is selected from the group consisting of carbon fiber, glass fiber, glass bead, glass flake, carbon black, talc, clay, kaolin, mica, calcium carbonate, and combinations thereof.

15. A liquid crystal display (LCD) backlight unit, comprising the thermoplastic polycarbonate resin composition of claim 1.

16. A pellet prepared from the thermoplastic polycarbonate resin composition of claim 1.

17. The pellet of claim 16, which has a flame retardancy of V-0 in accordance with UL 94 vertical test.

* * * * *